United States Patent [19]
Kravitz

[11] Patent Number: 5,957,044
[45] Date of Patent: Sep. 28, 1999

[54] APPARATUS FOR ADMINISTERING TREATMENTS TO PRE-PACKED BOXES OF PRODUCE

[75] Inventor: Howard S. Kravitz, Wayne, Pa.

[73] Assignee: EPL Technologies, Inc., Philadelphia, Pa.

[21] Appl. No.: 09/189,521

[22] Filed: Nov. 10, 1998

Related U.S. Application Data

[60] Provisional application No. 60/065,117, Nov. 12, 1997.

[51] Int. Cl.[6] .............................. A23B 7/00; A23B 7/14; A23L 3/00; A23L 3/34
[52] U.S. Cl. .............................. 99/534; 99/516; 134/113; 134/144
[58] Field of Search ..................................... 099/516, 517, 099/534–536, 473, 476, 487; 53/405, 408, 432, 440, 510, 512; 134/63, 72, 111, 113, 144, 153, 131, 180; 118/16, 24; 229/120, 5.84; 239/70, 77, 8, 143, 144, 106, 320; 422/3, 30, 37; 426/262, 263, 268, 270, 310, 312, 316, 321, 324, 335, 419

[56] References Cited

U.S. PATENT DOCUMENTS

| | | |
|---|---|---|
| 3,008,838 | 11/1961 | Brunsing et al. . |
| 3,522,057 | 7/1970 | Anderson et al. . |
| 3,814,820 | 6/1974 | Busta et al. .......................... 426/262 X |
| 3,819,329 | 6/1974 | Kaestner et al. . |
| 4,055,931 | 11/1977 | Myers . |
| 4,078,480 | 3/1978 | Luck . |
| 4,606,262 | 8/1986 | Robinson, Jr. et al. ............... 99/516 X |
| 4,660,468 | 4/1987 | Goldhahn .............................. 99/516 X |
| 4,808,303 | 2/1989 | Edwards et al. ....................... 239/70 X |
| 4,937,085 | 6/1990 | Cherry et al. ............................ 426/269 |
| 4,962,777 | 10/1990 | Bell ........................................ 99/517 X |
| 4,971,818 | 11/1990 | Pye . |
| 4,988,523 | 1/1991 | Gardner et al. .......................... 426/268 |
| 5,028,443 | 7/1991 | Wade . |
| 5,126,153 | 6/1992 | Beck ........................................ 426/269 |
| 5,312,034 | 5/1994 | Nakagawa et al. . |
| 5,316,778 | 5/1994 | Hougham ................................ 426/324 |
| 5,346,712 | 9/1994 | Cherry et al. ............................ 426/321 |
| 5,389,389 | 2/1995 | Beck ........................................ 426/269 |
| 5,421,138 | 6/1995 | Muise et al. . |
| 5,474,789 | 12/1995 | Hayami et al. . |
| 5,652,006 | 7/1997 | Assinder et al. ....................... 99/516 X |
| 5,718,377 | 2/1998 | Tedders et al. ...................... 239/143 X |

*Primary Examiner*—Timothy F. Simone
*Attorney, Agent, or Firm*—Clifford W. Browning; Woodard, Emhardt, Naughton, Moriarty & McNett

[57] ABSTRACT

An apparatus for administering treatments to pre-packed boxes of produce, comprising: a main frame defining a space sized and configured to receive a plurality of vertically stacked, pre-packed boxes of produce, each box having at least one pair of through hand holes located in opposing ends thereof, a first injector frame moveably mounted to the main frame opposite one of the two opposing sides of the vertically stacked boxes and a second injector frame moveably mounted to the main frame opposite the other of the opposing sides of the vertically stacked boxes; a plurality of spray injectors in fluid communication with a solution holding tank and with means to pump solutions from said holding tank to said spray injectors, the spray injectors being adjustably mounted on the injector frames, with a spray injector positioned in alignment with each hand hole exposed on each of the two opposing sides of the vertically stacked boxes; means to move the injector frames between a first position in which the spray injectors are outside of the vertically stacked boxes and a second position in which the spray injectors are inserted into the vertically stacked boxes through the hand holes; and means to alternate the pumping of solutions from the holding tank first to the spray injectors mounted to the first injector frame and second to the spray injectors mounted to the second injector frame when the injector frames are in the second position.

2 Claims, 5 Drawing Sheets

APPARATUS FOR ADMINISTERING TREATMENTS TO PRE-PACKED BOXES OF PRODUCE

This application claims the benefit of co-pending U.S. States provisional Pat. application Ser. No. 60/065,117, filed Nov. 12, 1997.

BACKGROUND OF THE INVENTION

Typically, produce is harvested, trimmed, and packed into produce boxes that are vertically stacked on pallets ready for transport to market, all of which occurs in the field. Broccoli crowns, heads, bunches and florets, for example, are typically harvested, trimmed, and packed into a 22-pound produce box provided with a hand hole at the top of each end. The 22-pound produce boxes are then stacked onto pallets. A typical broccoli pallet is 40"×48" and will have 48 of the 22-pound broccoli boxes stacked 8 square and 6 high, with one hand hold per box exposed on one of two opposite sides of the stack. When a broccoli pallet is fully loaded, the pallet is moved from the field to a cooling station where the produce boxes are typically injected with ice water slurries to reduce field heat residing within the processed broccoli. The broccoli pallets are then loaded onto transporters for shipment to market.

Moving broccoli from the field to market can take as long as one week in U.S. markets, and as long as two and one-half weeks in overseas markets, such as the Orient, for example. During the course of shipping processed broccoli to market through the various existing channels of distribution, it is probable that the broccoli will experience some temperature abuse. Temperature abuse typically begins to occur whenever processed broccoli is exposed to storage temperatures that are above 35° F., which is the optimum storage temperature at which processed broccoli will retain good color, odor, and taste for a period of three weeks or more. When storage temperatures exceed the 35° F. optimum, however, processed broccoli will begin to show signs of degradation. Degradation might include yellowing of the flower (the buds begin to open), discoloration of the cut end of the butt, blotches on the stalk, flaccidness in the laterals and stalk, off-odors, and a loss of taste (blandness).

Degradation of processed broccoli due to temperature abuse can be retarded through the use of commercially available processing aids. One such processing aid is the BROCCOLI FRESH brand processing aid of EPL Technologies, Inc., 2 International Plaza Suite 245, Philadelphia, Pa. 19113. The BROCOLLI FRESH brand processing aid was developed by EPL Technologies, Inc., to provide processed broccoli with a measure of safety against abusive temperature conditions. Processed broccoli that has been treated with the BROCCOLI FRESH brand processing aid has retained good quality attributes at temperatures as high as 50° F. for extended periods of time (about 14 days).

Heretofore, the BROCCOLI FRESH brand processing aid in solution has been manually sprayed onto freshly processed broccoli in metered amounts after the broccoli has been packed into the typical 22-pound produce box. Spraying was accomplished one box at a time, as the boxes were assembled and packed in the field. This method of administering the BROCCOLI FRESH brand processing aid has proven to be somewhat cumbersome and at times unsanitary. Several large 5 or 6-gallon containers of the BROCCOLI FRESH brand processing aid in solution had to be hand carried into the field each day. The containers were lifted onto rigs and the contents of the large containers were poured from the large containers into small hand-held sprayers. The hand-held sprayers had to be calibrated. Each box of processed broccoli was sprayed individually for a given number of seconds that coincided with the calibrated time required to dispense about 4 ounces of the BROCCOLI FRESH brand processing aid solution per 22-pound produce box. Furthermore, at the start of each day, the several large containers and the numerous hand-held sprayers had to be washed with chlorine and rinsed well before being put into use.

All of the manual labor involved in cleaning containers, mixing solutions, carrying solutions to the fields, etc., was viewed as being unsatisfactory by those who were directly involved in the day-to-day application of BROCCOLI FRESH brand processing aids to processed broccoli. For these reasons, another approach for administering BROCCOLI FRESH brand and other similar processing aids to harvested broccoli, and other harvested produce, was sought that would be less labor intensive and more sanitary.

SUMMARY OF THE INVENTION

The apparatus for administering treatments to pre-packed boxes of produce of the present invention provides for the simultaneous administration of treatments in solution to multiple boxes of produce at one time and at a single location remote from the field. Administration of processing aid treatments, for example, occurs while the produce boxes are stacked on pallets and are awaiting shipment to market. Most of the manual labor involved in treating boxes one by one in the field, as was the case in the prior art methods, is therefore eliminated. The apparatus of the present invention also allows sanitary conditions to prevail during the daily administration of processing aid treatments in solution to boxed and palleted produce. A single tank for processing aid treatments in solution replaces the numerous field tanks previously required. The efficient administration of processing aid solutions to an entire pallet of boxed produce in a single staging is made possible. Process setup, apparatus cleanup, and maintenance are therefore simplified. These latter requirements may be taken care of at the beginning and end of each production day in a more expeditious fashion than the prior art methods allowed, with a more limited amount of material and equipment handling required.

The apparatus of the present invention includes a main frame that positions a pallet of vertically stacked produce boxes such that one hand hole per produce box is positioned and exposed on one of two opposite sides of the main frame, and therefore the hand holes on each of the unexposed ends of laterally joined boxes are aligned. Two injector frames are mounted on the main frame, one on each side of the main frame. The injector frames each include several rows of spray injectors mounted on adjustable tracks. The total number of spray injectors on both injector frames equals at least the total number of produce boxes that are vertically stacked on a pallet, with one-half the total number mounted on each injector frame. The rows of spray injectors can be independently adjusted up or down on the injector frames to position each spray injector in direct line with an exposed hand hole in each of the produce boxes on the pallet.

It is through each of the exposed hand holes in the produce boxes that processing aids in solution are applied to the produce packed in the produce boxes. The spray injectors inject the processing aid treatment in a fog through the hand holes on the produce boxes to thereby fog the produce within the produce boxes with the processing aid solution.

The injector frames move toward and away from the main frame using conventional air hydraulics controlled by conventional air hydraulic command techniques. An operator may therefore selectively move the injector frames inward to bring the spray injectors into the hand holes of the produce boxes on the pallet and move them outward again. A conventional holding tank and pumping system hold and pump treatment solutions to the spray injectors in a timed sequence corresponding to the movements of the injector frames.

One embodiment of the present invention is an apparatus for administering treatments to pre-packed boxes of produce, comprising: a main frame defining a space sized and configured to receive a plurality of vertically stacked, pre-packed boxes of produce, each box having at least one pair of through hand holes located in opposing ends thereof, and each box aligned with the box on the laterally opposite side of the pallet such that the unexposed hand holes on adjoining box interfaces are aligned, and with one hand hole per box exposed on just one or the other of two opposing sides of the vertically stacked boxes; a first injector frame moveably mounted to the main frame opposite one of the two opposing sides of the vertically stacked boxes and a second injector frame moveably mounted to the main frame opposite the other of the opposing sides of the vertically stacked boxes; a plurality of spray injectors in fluid communication with a processing aid solution holding tank and with means to pump the processing aid solution from said holding tank to said spray injectors, the spray injectors being adjustably mounted on the injector frames, with a spray injector positioned in alignment with each hand hole exposed on each of the two opposing sides of the vertically stacked boxes; means to move the injector frames between a first position in which the spray injectors are outside of the vertically stacked boxes and a second position in which the spray injectors are inserted into the vertically stacked boxes through the hand holes; and means to alternate the pumping of processing aid solutions from the holding tank first to the spray injectors mounted to the first injector frame and second to the spray injectors mounted to the second injector frame when the injector frames are in the second position.

It is a principal object of the apparatus of the present invention to provide an apparatus that reduces the labor involved in administering processing aid or other treatment solutions to pre-packed boxes of produce, and that allows good, sanitary conditions to prevail during the administration of such solutions.

DETAILED DESCRIPTION OF THE PREFERRED EMBODIMENT

Figure 1:
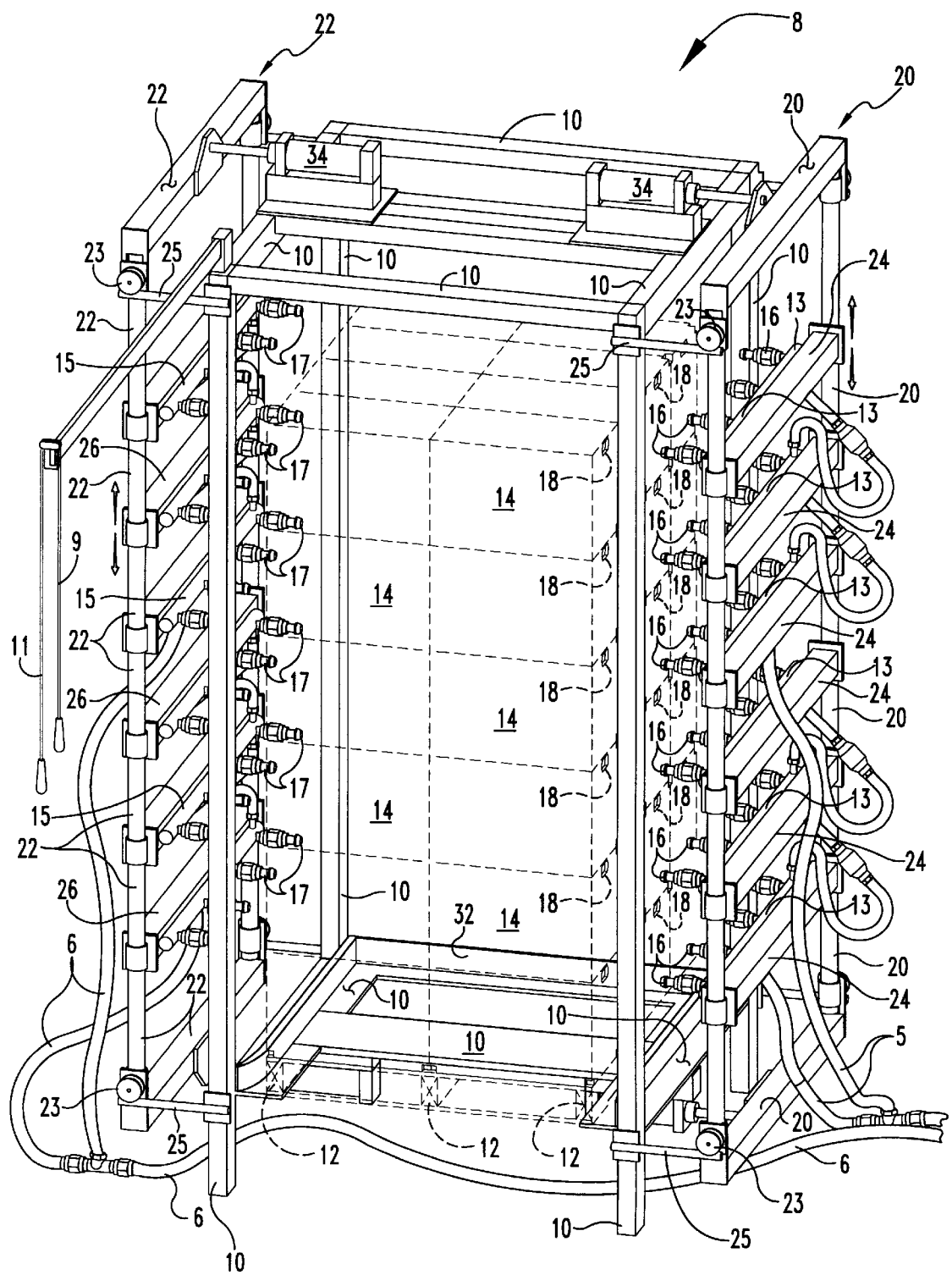
FIG. 1 is a perspective view of the main frame and injector frames of the apparatus of the present invention.
Figure 2:
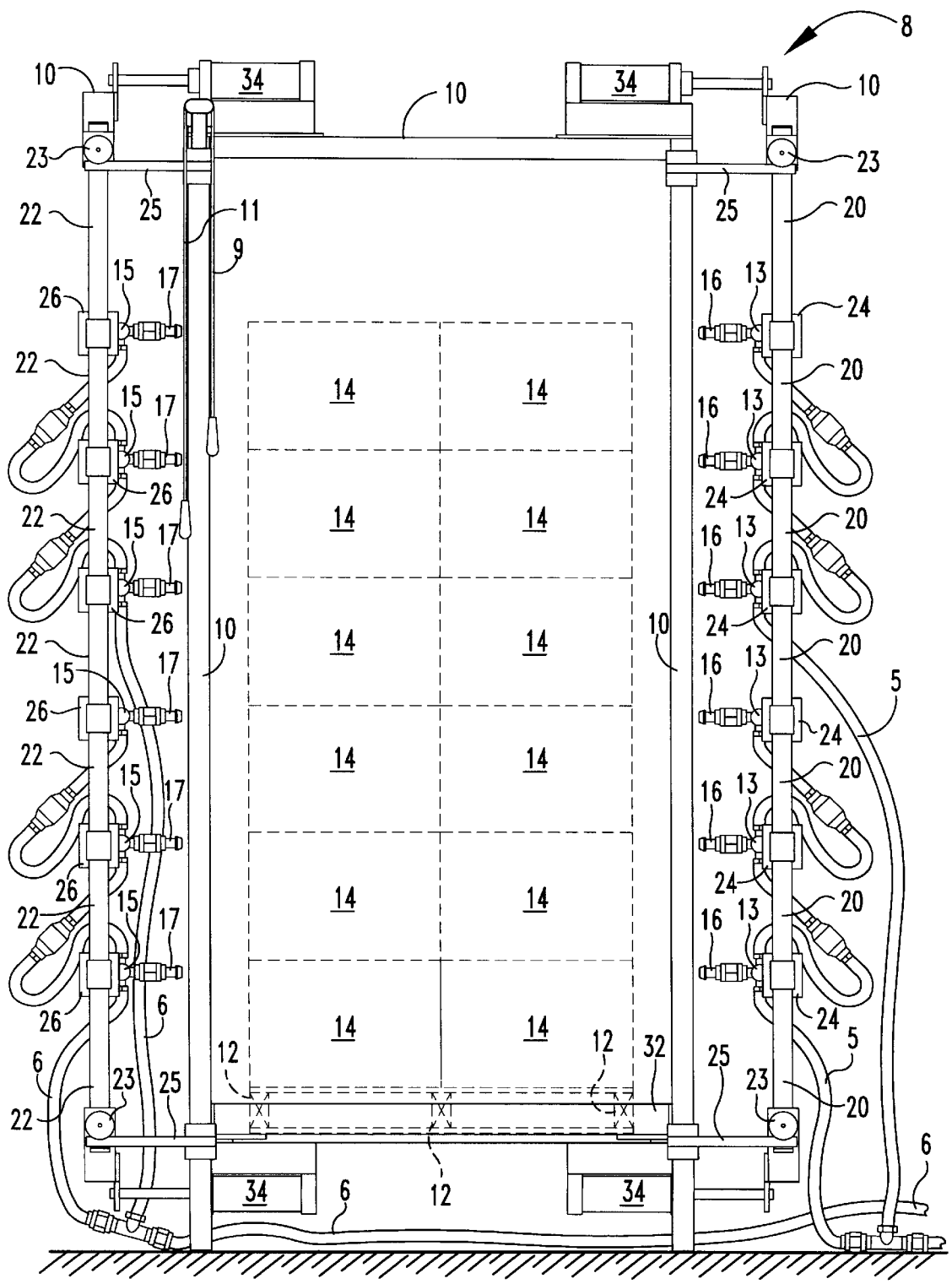
FIG. 2 is a front view of the apparatus of FIG. 1.
Figure 3:
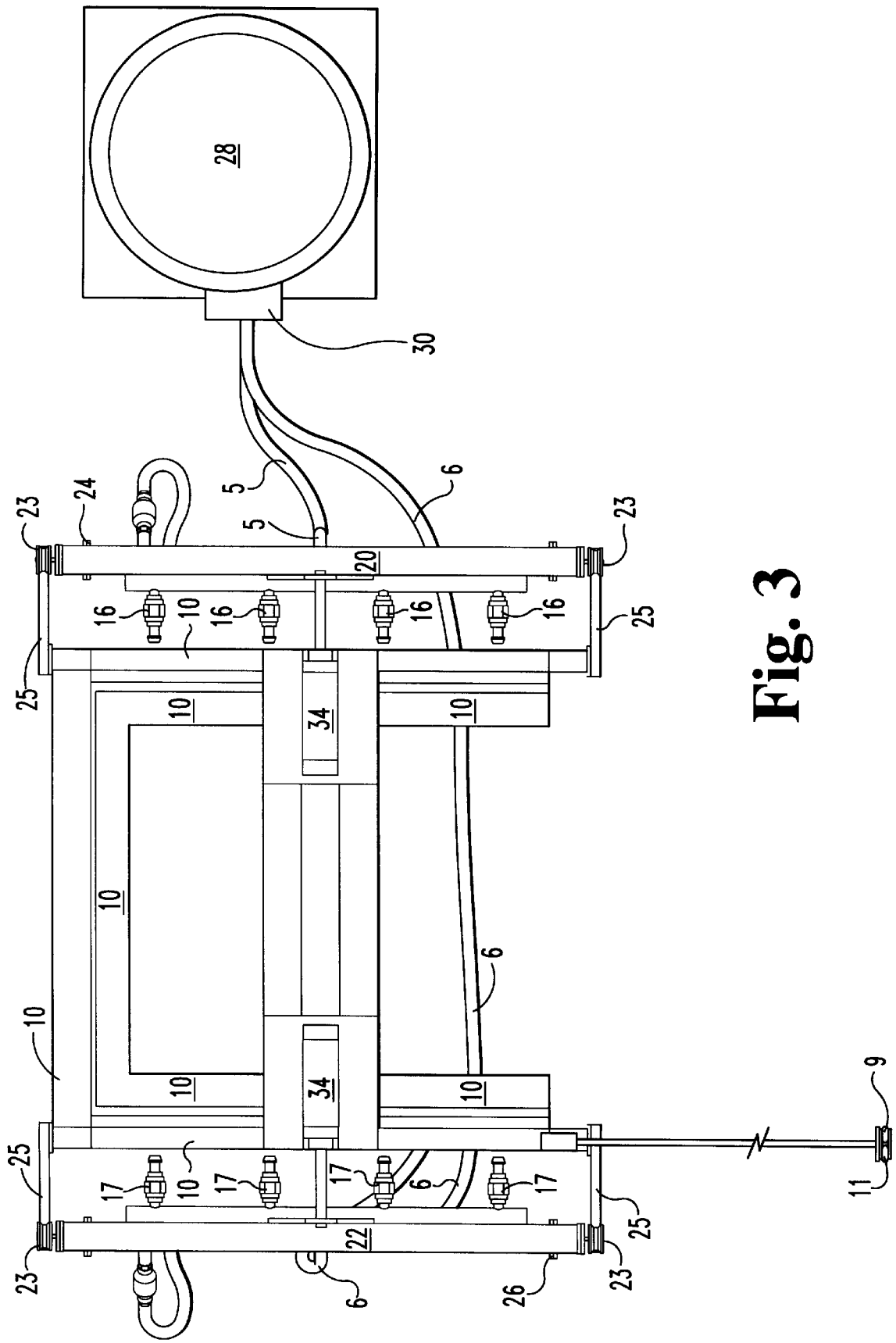
FIG. 3 is a top view of the apparatus of FIG. 1.
Figure 4:
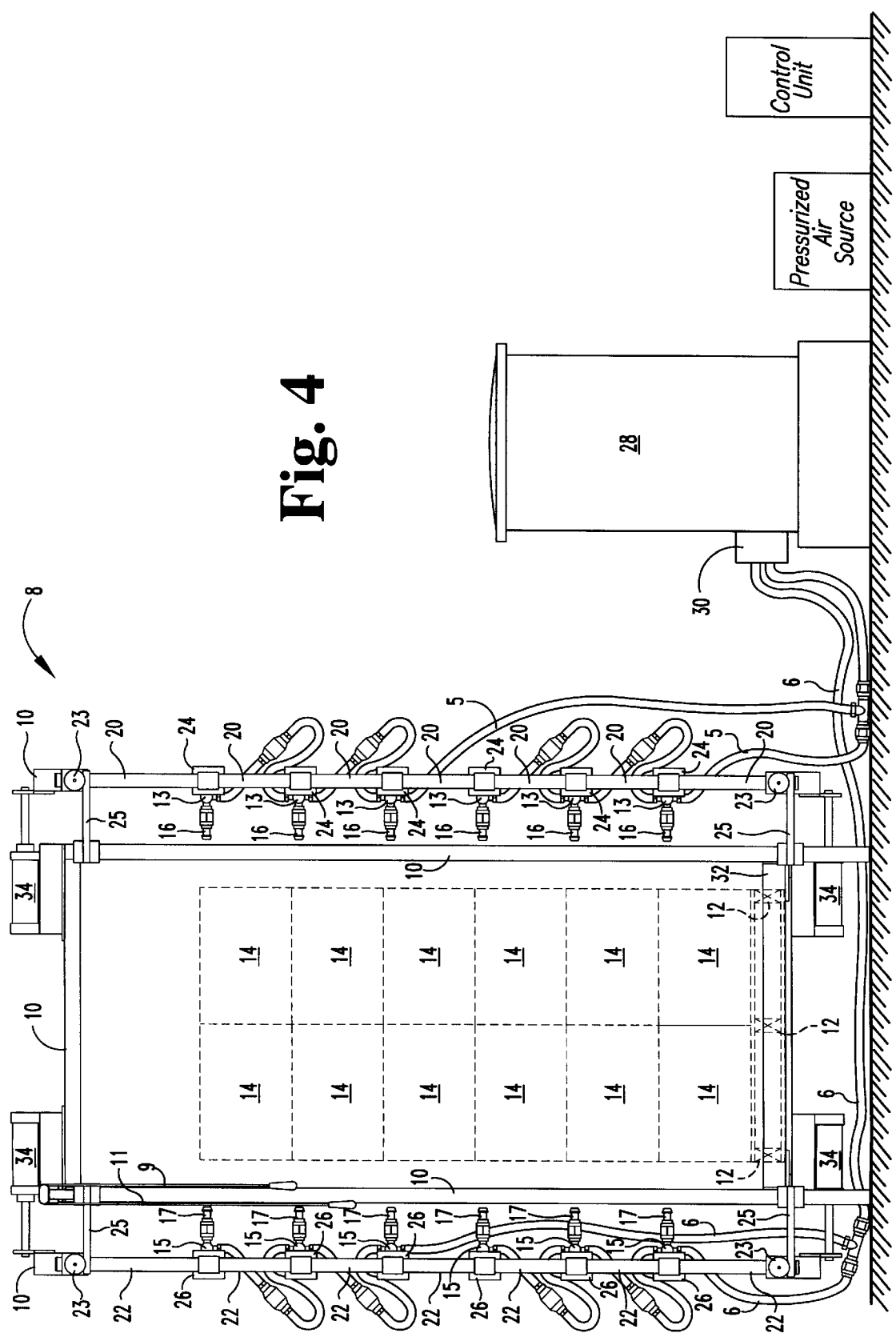
FIG. 4 is an elevation view of the apparatus of the present invention.

Referring now to the drawings, the preferred embodiment to date of the apparatus 8 for administering treatments to pre-packed boxes of produce of the present invention is illustrated. Apparatus 8 includes a main frame 10 that is sized and configured to receive and precisely position within a defined space therein a loaded pallet 12 of vertically stacked produce boxes 14. The produce boxes have been stacked on pallet 12 so that one handhold 18 per box is exposed on one of two opposite sides of the stack and the hand holes on each of the unexposed ends of laterally joined boxes are aligned. The pallet 12 is then positioned within main frame 10 such that the stack of produce boxes 14 has all of its exposed hand holes 18 directly opposite spray injectors 16,17 located on injector frames 20,22. The hand holes 18 are positioned in this manner to receive spray injectors 16,17. Two injector frames 20,22 are moveably mounted to the main frame 10 via rollers 23 and rails 25 and move toward and away from main frame 10 under the influence of conventional air hydraulics 34, with one injector frame 20,22 on either side of the main frame 10. Each injector frame 20,22 includes several rows of spray injectors 16,17, each row of spray injectors being in fluid communication via manifolds 13,15, mounted on tracks 24,26, with a conventional fluid storage holding tank 28. The rows of spray injectors 16,17 can be adjusted up or down (see the arrows in FIG. 1) on the injector frames 20,22 by moving tracks 24,26 up or down on injector frames 20,22. The spray injectors 16,17 can thereby be brought into better alignment with the exposed hand holes 18 in the stacked produce boxes 14 on pallet 12. It is through each of these hand holes 18 that processing aid solutions pumped from fluid storage tank 28 will be fogged onto the produce within the produce boxes 14 by means of the spray injectors 16,17.

The injector frames 20,22 may be selectively moved towards and away from the stacked produce boxes and the spray injectors 16,17 selectively activated by any conventional command methodologies. In the preferred embodiment to date, movement of injector frames 20,22 is accomplished using conventional air hydraulic technology powered by a pressurized air source, and treatment solutions are pumped to the spray injectors by conventional computer controlled commands timed by a control unit to coincide with movements of the injector frames 20,22. A conventional fluid solution holding tank 28 and fluid solution pumping system 30 are in fluid communication with the holding tank and the spray injector manifolds 13,15 through fluid tubing 5,6. Processing aid solutions are selectively moved in a closed loop within tank 28 for mixing and to the spray injectors 16,17 through fluid tubing 5,6 and manifolds 13,15 by the control unit.

Each loaded pallet 12 is typically placed into the main frame 10 of apparatus 8 by a forklift truck. As the loaded pallet 12 is moved into the main frame 10, the pallet 12 is forced against a back brace 32 of the main frame 10, which helps the forklift operator vertically align the produce boxes 14 within the main frame 10. The produce boxes 14 are typically stacked 6 or 7 high and square on a 40"×48" pallet, since this is a typical prerequisite for transporting pallets 12 side-by-side on a flatbed from the fields.

Once the loaded pallet 12 is in position within the space defined by the main frame 10, the forklift operator may trigger the start of the processing aid treatment process. In the preferred embodiment to date, the injection frames 20,22 are moved toward and away from the main frame 10 by conventional air hydraulics 34 triggered by pulling control lanyards 9,11. As the injection frames 20,22 travel towards the main frame 10, the spray injectors 16,17 on the injection frames 20,22 are moved into the hand holes 18 on the exposed ends of the produce boxes 14. The number of rows of spray injectors 16,17 is selected to correspond to the number of produce boxes 14 vertically stacked on the pallet 12 (commonly 6 or 7). The number of spray injectors 16,17 corresponds to the number of produce boxes 14 that are on each horizontal row on the pallet 12 facing the injector frames 16,17 (commonly 4). Therefore, a 48-box pallet commonly has twelve rows of spray injectors 16,17 (6 rows on each side) with 4 spray injectors 16,17 per row, for a total of 48 spray injectors 16,17, equaling one for each produce box 14 on the pallet 12.

Figure 5:
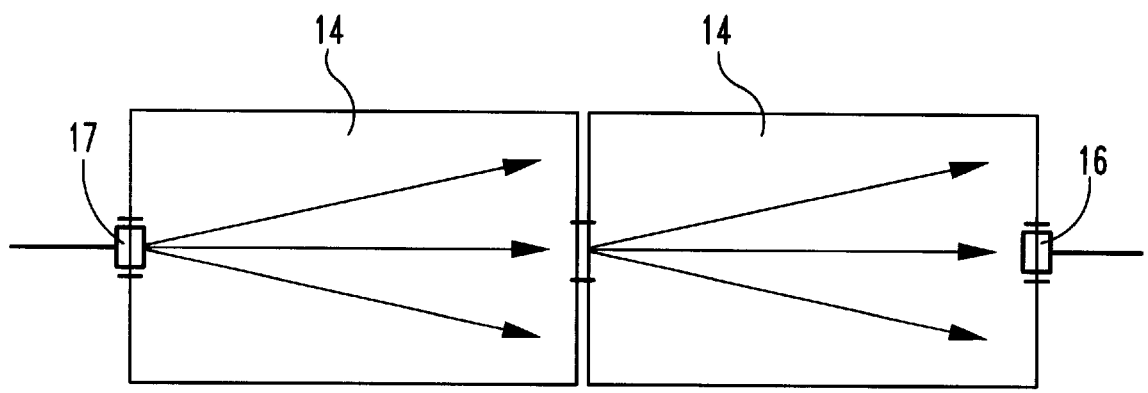
FIG. 5 illustrates the spray pattern produced by the apparatus of the present invention within adjoining produce boxes loaded on a pallet staged within the apparatus of the present invention.

Processing aid solutions are then applied to the produce boxes 14 by an automatic pumping cycle timed by a control unit to the movements of injector frames 20,22. Processing aid solutions are automatically pumped from the fluid solution holding tank 28 to the spray injectors 16,17 in a timed sequence that is triggered by the positioning of the spray injectors within the hand holes 18. Spray injectors then selectively fog processing aid solutions onto the produce within the produce boxes 14. One side of the pallet is fogged first and then the other side of the pallet is fogged. Each side is fogged separately for a reason. As illustrated in FIG. 5, fogging each side separately allows distribution of processing aid solutions into each box 14 laterally opposite to the box 14 being fogged at a given point in time. In this manner, the processing aid spray hits the corners of the produce boxes at the far walls from the spray injectors 16,17, which walls would otherwise not come into contact with the processing aid solutions if spraying was done simultaneously on both sides. Processing aid treatments go into an adjoining box through the adjoining box's internal hand hole 18 and then reaches the far wall of the adjoining box that otherwise would not be directly contacted with the processing aid solutions. Each side would be alternatively sprayed for 6 to 7 seconds to apply about 2 ounces of the BROCCOLI FRESH brand processing aid treatment per box. At the end of such a cycle, each box 14 would have received about 4 ounces of BROCCOLI FRESH brand processing aid solution. A 48-box pallet would be sprayed with about 1.5 gallons of BROCCOLI FRESH brand processing aid solution (48×4=192 ounces).

When the spraying of a loaded pallet 12 has been completed, an operator commands the injection frames 16,17 to move back from the produce boxes 14 to positions outside main frame 10 by pulling lanyard 9. An operator can then remove the treated pallet 12 from the main frame 10 and replace it with the next pallet to be treated.

The cooling station of a typical broccoli grower is where harvested broccoli is typically handled en mass, and it is there that the best opportunity exists for using the apparatus 8 of the present invention to administer processing aid solutions to loaded pallets of broccoli boxes. As each pallet 12 arrives at the cooling station, it is placed into the apparatus 8 of the present invention. The 48 produce boxes on the typical pallet 12 are then treated with measured amounts of processing aid or treatment solutions in a matter of seconds. The pallet may then be staged at an ice injection station where water and ice slurries may be injected throughout all the produce boxes 14 on the pallet. Alternatively, the produce boxes 14 on the pallet 12 may be cooled in a vacuum tube, in which case the excess moisture from the processing aid or treatment solution serves as a cooling medium through the evaporation process.

While the apparatus of the present invention has been illustrated and described in detail in the drawings and in the foregoing description with respect to processing aids, the same is to be considered as illustrative and not restrictive in character. Only the preferred embodiment to date has been illustrated and described, but all changes and modifications that come within the spirit of the invention are to be protected.

I claim:

1. An apparatus for administering treatments to pre-packed boxes of produce, comprising:

a main frame defining a space sized and configured to receive a plurality of vertically stacked, pre-packed boxes of produce, each box having at least one pair of through hand holes located in opposing ends thereof, and with one hand hole per box exposed on just one or the other of two opposing sides of said vertically stacked boxes, and with the unexposed hand hole of each box aligned with the unexposed hand hole of the laterally adjoining box;

a first injector frame moveably mounted to said main frame opposite one of said two opposing sides of said vertically stacked boxes and a second injector frame moveably mounted to said main frame opposite the other of said opposing sides of said vertically stacked boxes;

a plurality of spray injectors in fluid communication with a treatment solution holding tank and with means to pump treatment solutions from said holding tank to said spray injectors, said spray injectors being adjustably mounted on said injector frames, with a spray injector positioned in alignment with each hand hole exposed on each of said two opposing sides of said vertically stacked boxes;

means to move said injector frames between a first position in which said spray injectors are outside of said vertically stacked boxes and a second position in which said spray injectors are inserted into said vertically stacked boxes through said hand holes; and means to alternate the pumping of treatment solutions from said holding tank first to said spray injectors mounted to said first injector frame and second to said spray injectors mounted to said second injector frame when said injector frames are in said second position.

2. The apparatus of claim 1 wherein said main frame defines a space sized and configured to receive about 48 pre-packed 22-pound produce boxes stacked 8 square and 6 high on a 40"×48" pallet.

* * * * *

UNITED STATES PATENT AND TRADEMARK OFFICE
CERTIFICATE OF CORRECTION

PATENT NO. : 5,957,044
DATED : September 28, 1999
INVENTOR(S) : Howard S. Kravitz It is certified that error appears in the above-identified patent and that said Letters Patent is hereby corrected as shown below:

Title page, item [56], insert the following references:

| | | | |
|---|---|---|---|
| 4,425,768 | 01/1984 | Burns | 62/237 |
| 4,484,448 | 11/1984 | Crabb, Jr. | 62/64 |
| 5,497,698 | 03/1996 | Bolkestein | 99/476 |

In column 1, line 6, please delete "states".

In column 1, line 42, "flaccidness" should read --flacidness--.

Signed and Sealed this

Twelfth Day of September, 2000

Q. TODD DICKINSON

*Attest:*

*Attesting Officer*        *Director of Patents and Trademarks*